July 2, 1935.  V. BENDIX ET AL  2,006,494

BRAKE

Filed June 5, 1929  2 Sheets-Sheet 1

INVENTORS
Vincent Bendix
Ludger E. LaBrie
BY
Jn. W. McConkey
ATTORNEY

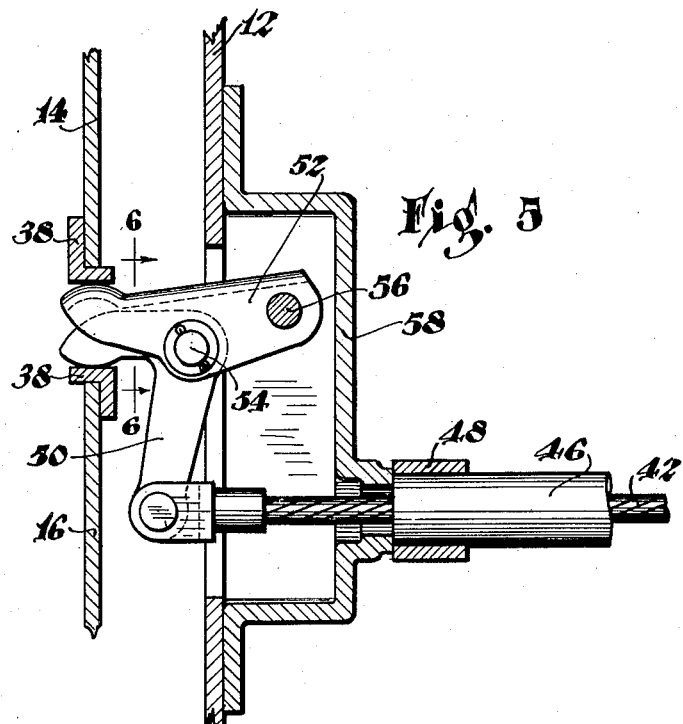
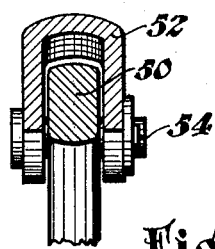
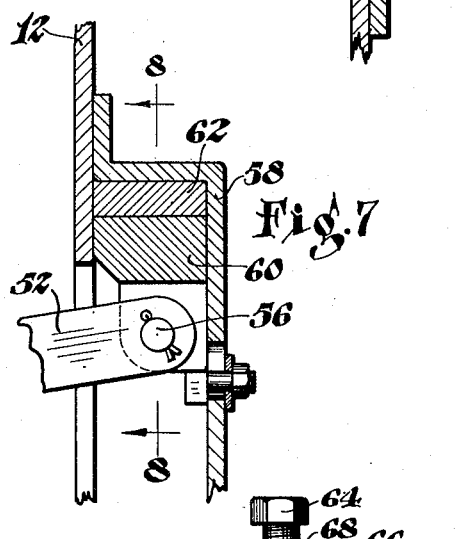
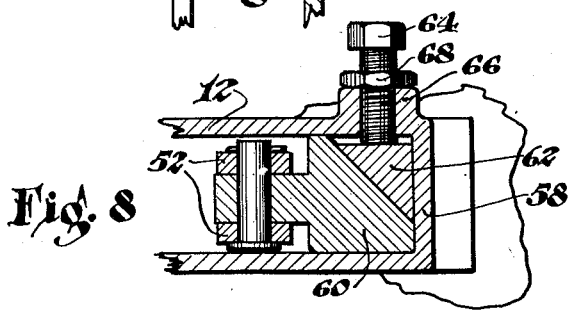

Patented July 2, 1935

2,006,494

UNITED STATES PATENT OFFICE 2,006,494

BRAKE

Vincent Bendix, Chicago, Ill., and Ludger E. La Brie, South Bend, Ind., assignors to Bendix Brake Company, South Bend, Ind., a corporation of Illinois Application June 5, 1929, Serial No. 368,600

28 Claims. (Cl. 188—78)

This invention relates to brakes, and is illustrated as embodied in an internal expanding automobile brake. An object of the invention is to simplify the applying means of the brake, and preferably adapt it for use with a Bowden control, by utilizing a novel lever system or the like which we prefer to arrange in such a manner as to balance the trusts on the shoes or their equivalents. Various features of novelty relate to arranging the lever or levers to balance their thrusts, and to act in a plane generally perpendicular to the plane of the brake, and to be operated by a tension element such as the cable of a Bowden control entering the backing plate substantially at right angles thereto, and to other novel combinations and arrangements and structures which will be apparent from the following description of the illustrative embodiments shown in the accompanying drawings, in which:

Figure 5 is a section corresponding to Figure 2, but showing a different lever arrangement;

Figure 6 is a section through these different levers on the line 6—6 of Figure 5;

Figure 7 is a section corresponding to the upper part of Figure 5, and showing one means of adjusting the fulcrum of one of the levers, to compensate for the wear of the brake; and Figure 8 is a partial section through this adjustment, on the line 8—8 of Figure 7.

Figure 1:
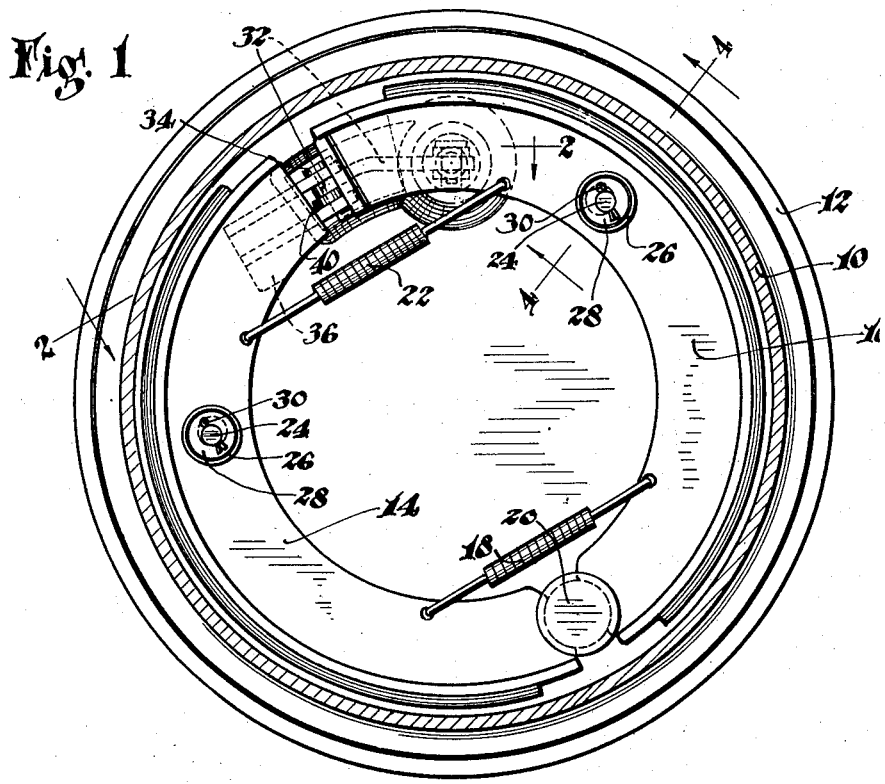
Figure 1 is a vertical section through one embodiment, just inside the head of the brake drum, and showing the brake shoes in side elevation.

The brake illustrated in Figure 1 includes a rotatable drum 10, at the open side of which is a suitable support such as a backing plate 12, and within which is arranged the friction means of the brake. The friction means preferably includes shoes 14 and 16, the lower ends of which are held by a tensioned spring 18 in pivotal engagement with a fixed anchor 20 carried by the backing plate. The brake is provided with the usual return spring 22 tensioned between the shoes, and with suitable steady rests including pins 24 carried by the backing plate and extending through openings in the shoes and having cup-shaped washers 26 containing cupped spring washers 28 held by means such as cotter pins 30.

Figure 2:
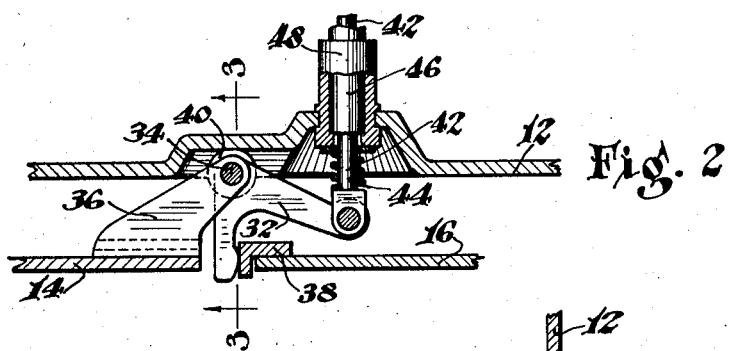
Figure 2 is a partial section through the applying means, on the line 2—2 of Figure 1.
Figures 3, 4:
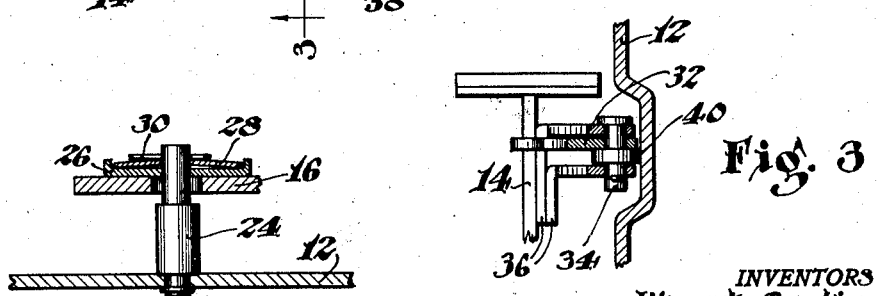
Figure 3 is a partial section through the applying means in a plane at right angles to Figure 2, on the line 3—3 of Figure 2.
Figure 4 is a partial section, on the line 4—4 of Figure 1, showing a steady rest.

The brake is applied by novel means including, in the embodiment of Figures 1–4, a bellcrank lever 32 movable in a plane generally perpendicular to the plane of the brake and to the plane of the backing plate, and which is mounted by means such as a pivot pin 34 between two stampings 36 welded to the side of the web of shoe 14 and projecting laterally therefrom, and which lever has one arm rounded as shown in Figure 2 and in direct thrust engagement with an angle-section trust plate 38 welded to the end of the web of shoe 16 while its other end extends generally parallel to the backing plate past the end of shoe 16.

The backing plate is embossed outwardly to clear the lever 32, and is engaged by anti-friction means such as a roller 40 mounted on the pivot 34. Roller 40 transmits to the backing plate the lateral component of the brake-applying force which is in the direction of the backing plate.

Lever 32 is operated by means such as a flexible tension element or steel cable 42, extending generally perpendicular to and through the backing plate and connected to the end of the above-described arm of the lever 32. A return spring 44 of the coil compression type may be sleeved on cable 42 between the lever 32 and the backing plate.

The steel cable 42 preferably forms part of a Bowden control, which control also includes a flexible conduit 46, of any desired construction so long as it is not too compressible lengthwise, which houses the cable and which is connected at its end to a fitting 48 carried by the backing plate of the brake, the other end of the conduit preferably being supported on the chassis frame. The flexibility of the cable 42 permits the lever 32 to shift slightly bodily, to balance its thrusts on the shoes 14 and 16.

In the arrangement of Figure 5, the cable 42 is connected to a bellcrank lever 50 having one arm to which the cable is connected and which is generally parallel to the plane of the brake and the plane of the backing plate, and having another arm with a rounded arm thrusting directly against the end of shoe 16. Lever 50 is nested within the channel of a channel-section generally-straight lever 52, to which it is connected by a pivot 54. Lever 52 has one end rounded and in direct thrust engagement with the end of shoe 14, the other end being fulcrumed on a pivot 56 carried by a housing or stamping 58 spot-welded or otherwise secured to the backing plate.

The device of Figure 5 may be made adjustable, to permit compensation for wear of the brake, as shown in Figures 7 and 8, by mounting the fulcrum pivot 56 in a wedge block 60 slidably held by the walls of stamping 58 and by the backing plate, and engaged by a wedge 62 operated by tightening up on a setscrew 64 threaded through a boss 66 on the backing plate and locked by means such as a nut 68.

While certain illustrative constructions have been described in detail, it is not our intention to limit the scope of the invention to those particular constructions, or otherwise than by the terms of the appended claims.

We claim:

1. A brake comprising, in combination, a support having a pair of shoes pivotally anchored thereon at their adjacent ends and which are formed with stiffening webs, floating applying means carried by the opposite ends of the shoes and including a bracket secured to the side of the web of one shoe and having pivoted thereon a lever acting on the end of the web of the other shoe, and a Bowden control including a flexible conduit secured at its end to the support and a flexible tension element extending through the conduit and connected to the floating applying means.

2. A brake comprising, in combination, a support having a pair of shoes pivotally anchored thereon at their adjacent ends and which are formed with stiffening webs, floating applying means carried by the opposite ends of the shoes and including a bracket secured to the side of the web of one shoe and having pivoted thereon a lever acting on the end of the web of the other shoe, and a Bowden control arranged substantially perpendicular to the plane of the brake and including a flexible conduit secured at its end to the support and a flexible tension element extending through the conduit and connected to the floating applying means.

3. A brake comprising, in combination, a support having a pair of shoes pivotally anchored thereon at their adjacent ends, applying means for the other ends of the shoes including a pivoted lever arranged in a plane generally perpendicular to the plane of the brake, and a Bowden control arranged substantially perpendicular to the plane of the brake and including a flexible conduit secured at its end to the support and a flexible tension element extending through the conduit and connected to the lever, said applying means having a part engaging the support and transmitting thereto the force acting thereon perpendicular to the support without interfering with the spreading action of the applying means acting on said shoes.

4. A brake comprising, in combination, a support having a pair of shoes pivotally anchored thereon at their adjacent ends, applying means for the other ends of the shoes including a pivoted lever device having a fulcrum part engaging said support, and a Bowden control arranged substantially perpendicular to the plane of the brake and including a flexible conduit secured at its end to the support and a flexible tension element extending through the conduit and connected to the lever device.

5. A brake comprising, in combination, a support forming a backing plate, friction means having adjacent separable ends, a leverage device in a plane generally perpendicular to the brake and acting directly on said ends and having a fulcrum part engaging said support, a flexible conduit having at least its end portion substantially perpendicular to the plane of the brake and which is secured at said end, and a flexible tension element extending through the conduit and connected to the leverage device.

6. A brake comprising, in combination, a backing plate provided with friction means having adjacent separable ends, a pivoted bellcrank lever movable in a plane generally perpendicular to the brake and having one arm extending generally parallel to the plane of the brake, a fulcrum part for the lever engaging said backing plate, a flexible conduit having at least its end portion substantially perpendicular to the plane of the brake and which is secured at said end, and a flexible tension element extending through the conduit and connected to said arm of the lever.

7. A brake comprising, in combination, a backing plate provided with friction means having adjacent separable ends, a pivoted bellcrank lever movable in a plane generally perpendicular to the brake and having one arm extending generally parallel to the plane of the brake and which lever pivotally fulcrums on the backing plate, said lever being bodily shiftable to balance its action on said separable ends, a flexible conduit having at least its end portion substantially perpendicular to the plane of the brake and which is secured at said end, and a flexible tension element extending through the conduit and connected to said arm of the lever.

8. A brake comprising, in combination, a backing plate support device provided with friction means having adjacent separable ends, a lever in a plane generally perpendicular to the brake and acting directly on said ends, said lever being bodily shiftable to balance its action on said separable ends, a fulcrum part for the lever engaging said support device, a flexible conduit having at least its end portion substantially perpendicular to the plane of the brake and which is secured at said end, and a flexible tension element extending through the conduit and connected to the lever.

9. A brake comprising, in combination, friction means having adjacent separable ends, a lever in a plane generally perpendicular to the brake and acting directly on said ends, said lever being mounted on one of said separable ends and in direct thrust engagement with the other, a flexible conduit having at least its end portion substantially perpendicular to the plane of the brake and which is secured at said end, and a flexible tension element extending through the conduit and connected to the lever.

10. A brake comprising, in combination, friction means having adjacent separable ends, an operating lever movable in a plane generally perpendicular to the plane of the brake and which is pivoted on one of said ends and which has at its pivotal connection to said end antifriction means taking the force on the lever crosswise of said end and which has a portion in direct thrust engagement with the other of said ends, a conduit secured to the brake, and a tension element extending through the conduit into the brake and there connected to said lever.

11. A brake comprising, in combination, a backing plate carrying friction means having adjacent separable ends, an operating lever movable in a plane generally perpendicular to the backing plate and which is pivoted on one of said ends and which has at its pivotal connection to said end means engaging the backing plate and taking the force on the lever crosswise of said end and which has a portion in direct thrust engagement with the other of said ends, a conduit extending outwardly of the brake from the backing plate, and a tension element extending through the conduit and through the backing plate into the brake and there connected to said lever.

12. A brake comprising, in combination, a backing plate carrying friction means having adjacent separable ends, and an operating lever movable in a plane generally perpendicular to the backing plate and which is pivoted on one of said ends and which has a portion in direct thrust engagement wtih the other of said ends, said lever having one end formed as an arm extending generally parallel to the backing plate, together with a tension element having at least its end arranged generally perpendicular to the backing plate and connected to said arm.

13. A brake comprising, in combination, a backing plate, friction means having adjacent separable ends, a lever pivoted on the backing plate and swinging in a plane perpendicular to the backing plate and engaging one of said ends, a second lever pivoted on the first lever and also swinging in a plane perpendicular to the backing plate and engaging the other of said ends, and operating means for rocking the second lever to spread said ends apart to apply the brake.

14. A brake comprising, in combination, a backing plate, friction means having adjacent separable ends, a lever pivoted on the backing plate and engaging one of said ends, a second lever formed as a bellcrank pivoted on the first lever and engaging the other of said ends and having its end formed as an arm paralleling the backing plate, and a tension element perpendicular to the backing plate and connected to said arm for rocking the second lever to spread said ends apart to apply the brake.

15. A brake-applying device comprising a generally-straight channel-section lever pivoted at one end, and a bellcrank lever pivoted within the channel of the straight lever.

16. A brake comprising, in combination, a backing plate, friction means having adjacent separable ends, a lever pivoted on the backing plate and engaging one of said ends, a second lever formed as a bellcrank pivoted on the first lever and engaging the other of said ends and having its ends formed as an arm paralleling the backing plate, and a tension element perpendicular to the backing plate and connected to said arm for rocking the second lever to spread said ends apart to apply the brake, said two levers being movable in a plane generally perpendicular to the plane of the backing plate.

17. A brake shoe having a web on the side of which at its end are mounted a pair of stampings with parallel portions projecting laterally from the side of said web and between which an operating lever is adapted to be mounted.

18. A brake shoe having at its end a pair of stampings with parallel laterally-projecting portions between which an operating lever is adapted to be mounted, in combination with an anti-friction roller carried by said stampings and engageable with the backing plate.

19. A brake-applying device comprising a generally-straight channel-section lever pivoted at one end, and a bellcrank lever pivoted within the channel of the straight lever, in combination with an adjustable fulcrum for the straight lever.

20. A brake comprising, in combination, a backing plate, friction means having adjacent separable ends, a lever pivoted on the backing plate and engaging one of said ends, a second lever pivoted on the first lever and engaging the other of said ends, and operating means for rocking the second lever to spread said ends apart to apply the brake, together with means for shifting the fulcrum of one of said levers to adjust the brake to compensate for wear.

21. A brake-applying device comprising a generally-straight channel-section lever pivoted at one end, and a bellcrank lever pivoted within the channel of the straight lever, in combination with an adjustable fulcrum for the straight lever and a wedge for adjusting said fulcrum.

22. A brake comprising, in combination, a backing plate, friction means having adjacent separable ends, a lever pivoted on the backing plate and engaging one of said ends, a second lever pivoted on the first lever and engaging the other of said ends, and operating means for rocking the second lever to spread said ends apart to apply the brake, together with a wedge for shifting the fulcrum of one of said levers to adjust the brake to compensate for wear.

23. A brake comprising, in combination, a backing plate, applying means including a pair of levers swinging in planes perpendicular to the backing plate, one of which is pivoted on the other and which other is pivotally supported on the backing plate, and a tension element extending through the backing plate and connected to one of said levers.

24. A brake comprising, in combination, a backing plate, applying means including a pair of levers, one of which is pivoted on the other and which other is pivotally supported on the backing plate, and at least one of which levers is movable in a plane generally perpendicular to the backing plate, and a tension element extending through the backing plate and connected to the last-mentioned one of said levers.

25. A brake comprising a backing plate and a brake-applying lever movable generally crosswise of the backing plate, a housing secured to the backing plate over said lever, and a tension element extending through the housing and connected to the lever.

26. A brake comprising a backing plate and a brake-applying lever movable generally crosswise of the backing plate, a housing secured to the backing plate over said lever, a Bowden-type flexible conduit connected at its end to the housing, and a tension element extending through the conduit inside the housing and there connected to said lever.

27. A brake comprising a backing plate and a brake-applying lever device movable generally cross-wise of the backing plate, a housing secured to the backing plate over said lever, a pivot for said device mounted in one end of the housing, and a tension element extending through the opposite end of the housing and connected to the lever.

28. A brake comprising a backing plate and a brake-applying lever movable generally crosswise of the backing plate, a housing secured to the backing plate over said lever, a Bowden-type flexible conduit connected at its end to the opposite end of the housing, and a tension element extending through the conduit inside the housing and there connected to said lever.

VINCENT BENDIX.
LUDGER E. LA BRIE.